US010554269B2

(12) United States Patent
Li et al.

(10) Patent No.: US 10,554,269 B2
(45) Date of Patent: Feb. 4, 2020

(54) ACCESS METHOD AND DEVICE

(71) Applicant: HUAWEI TECHNOLOGIES CO., LTD., Shenzhen (CN)

(72) Inventors: Yanchun Li, Shenzhen (CN); Yunbo Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 313 days.

(21) Appl. No.: 15/440,687

(22) Filed: Feb. 23, 2017

(65) Prior Publication Data
US 2017/0163322 A1 Jun. 8, 2017

Related U.S. Application Data

(63) Continuation of application No. PCT/CN2014/085225, filed on Aug. 26, 2014.

(51) Int. Cl.
*H04L 12/00* (2006.01)
*H04B 7/0456* (2017.01)
(Continued)

(52) U.S. Cl.
CPC ........ *H04B 7/0456* (2013.01); *H04W 74/002* (2013.01); *H04W 74/0816* (2013.01)

(58) Field of Classification Search
None
See application file for complete search history.

(56) References Cited

U.S. PATENT DOCUMENTS

2005/0138199 A1 6/2005 Li et al.
2006/0056421 A1* 3/2006 Zaki ............... H04L 1/1664
370/400

(Continued)

FOREIGN PATENT DOCUMENTS

CN 1744602 A 3/2006
CN 1833454 A 9/2006
(Continued)

OTHER PUBLICATIONS

International Search Report dated Jun. 2, 2015 in corresponding International Patent Application No. PCT/CN2014/085225.
(Continued)

*Primary Examiner* — Ajit Patel
*Assistant Examiner* — Lionel Preval
(74) *Attorney, Agent, or Firm* — Slater Matsil, LLP

(57) ABSTRACT

Embodiments provide an access method and a device, where the method includes: determining that N second receiving devices communicate with a second sending device by using a radio resource, where N is a positive integer greater than or equal to 1; obtaining a receive effective channel vector from each second receiving device to a first sending device; obtaining a transmit antenna spatial correlation matrix of the first sending device; determining M transmit vectors; and separately communicating, by the first sending device, with K first receiving devices by using K of the M transmit vectors, where K is a positive integer less than or equal to M. According to the foregoing technical solutions, in a case in which the radio resource has been occupied by the second receiving device, the first sending device can send data by using the radio resource.

14 Claims, 8 Drawing Sheets

(51) Int. Cl.
*H04W 74/00* (2009.01)
*H04W 74/08* (2009.01)

(56) References Cited

U.S. PATENT DOCUMENTS

| | | | |
|---|---|---|---|
| 2007/0092019 A1* | 4/2007 | Kotecha | H04B 7/0452 375/267 |
| 2008/0130803 A1 | 6/2008 | Chang et al. | |
| 2008/0153502 A1* | 6/2008 | Park | H04W 8/005 455/446 |
| 2010/0329236 A1* | 12/2010 | Sampath | H04W 56/0005 370/350 |
| 2011/0038332 A1* | 2/2011 | Liu | H04L 1/1685 370/329 |
| 2011/0261708 A1 | 10/2011 | Grandhi | |
| 2012/0063344 A1 | 3/2012 | Ohm et al. | |
| 2012/0076081 A1 | 3/2012 | Merlin et al. | |
| 2012/0294170 A1* | 11/2012 | Yu | H04L 25/0242 370/252 |
| 2013/0070668 A1 | 3/2013 | Merlin et al. | |
| 2016/0365963 A1 | 12/2016 | Yang et al. | |
| 2017/0134975 A1* | 5/2017 | Huang | H04W 16/10 |

FOREIGN PATENT DOCUMENTS

| | | |
|---|---|---|
| CN | 1996908 A | 7/2007 |
| CN | 101394626 A | 3/2009 |
| CN | 101621360 A | 1/2010 |
| CN | 102123514 A | 7/2011 |
| CN | 103002591 A | 3/2013 |
| CN | 103828470 A | 5/2014 |

OTHER PUBLICATIONS

IEEE, "Part 11: Wireless LAN Medium Access Control (MAC) and Physical Layer (PHY) Specifications; Amendment 3: Enhancement for Very High Throughput in the 60 GHz Band," IEEE Computer Society, IEEE Std 802.11, Dec. 28, 2012.
Extended European Search Report, dated Jul. 28, 2017, in European Application No. 14900651.2 (8 pp.).
International Search Report dated Jun. 2, 2015 in corresponding International Application No. PCT/CN2014/085225.
Search Report, dated Nov. 26, 2018, in Chinese Application No. 201480056603.1 (3 pp.).
Office Action, dated Dec. 5, 2018, in Chinese Application No. 201480056603.1 (5 pp.).

* cited by examiner

ACCESS METHOD AND DEVICE

CROSS-REFERENCE TO RELATED APPLICATIONS

This application is a continuation of International Application No. PCT/CN2014/085225, filed on Aug. 26, 2014, the disclosure of which is hereby incorporated by reference in its entirety.

TECHNICAL FIELD

Embodiments relate to the field of communications technologies, and more specifically, to an access method and a device.

BACKGROUND

A carrier sense multiple access (CSMA) technology is a channel sharing method applied to a wireless communications system. A communications device makes a channel access decision by sensing a channel for idle or busy. Determining, by the communications device, whether the channel is idle or busy is referred to as clear channel assessment (CCA). When a radio resource is idle, multiple nodes may contend for the idle radio resource. If a node learns, in a sensing manner, that the radio resource has been occupied, or after a node obtains a notification that the radio resource is to be occupied, the node does not occupy the radio resource.

With the development of technology, a multiple-input multiple-output (MIMO) technology finds wider applications. A node that supports the MIMO technology has a relatively strong anti-interference capability. If two neighboring nodes (for example, a node 1 and a node 2) that support the MIMO occupy a same radio resource, the node 1 may not cause interference to data transmission of the node 2. Likewise, the node 2 does not cause interference to data transmission of node 1 either. However, if the CCA in the prior art is applied, the node 2 may consider that a radio resource used by the node 1 has been occupied. In this case, the node 2 does not occupy the radio resource for data transmission. In this way, the relatively strong anti-interference capability of the MIMO technology cannot be effectively utilized as an advantage, and therefore a waste of the radio resource is caused.

SUMMARY

Embodiments provide an access method and a device, which can effectively improve radio resource usage efficiency.

According to a first aspect, an embodiment provides a device, where the device supports a carrier sense multiple access technology, and the device includes: a determining unit, configured to determine that N second receiving devices communicate with a second sending device by using a radio resource, where N is a positive integer greater than or equal to 1; an obtaining unit, configured to obtain a receive effective channel vector from each second receiving device to the device, and a network allocation vector NAV duration for which each second receiving device occupies the radio resource; where the obtaining unit is further configured to obtain a transmit antenna spatial correlation matrix of the device; and the determining unit is further configured to determine M transmit vectors, where the M transmit vectors meet a first preset condition and a second preset condition, the first preset condition is: a channel statistical measurement value that is determined according to the M transmit vectors determined by the determining unit and the transmit antenna spatial correlation matrix obtained by the obtaining unit is less than a first preset value, and the second preset condition is: all N interference measurement values that are determined according to the M transmit vectors determined by the determining unit and N receive effective channel vectors obtained by the obtaining unit are less than a second preset value, where M is a positive integer greater than or equal to 1; and a communication unit, configured to separately communicate with K first receiving devices within a specified time by using K of the M transmit vectors determined by the determining unit and the radio resource, where K is a positive integer less than or equal to M, and the specified time is an end time of the longest one of N NAV durations.

According to a second aspect, an embodiment provides a device, where the device supports a carrier sense multiple access technology, and the device includes: a determining unit, configured to determine that a second sending device communicates with N second receiving devices by using a radio resource; an obtaining unit, configured to obtain a transmit effective channel vector from the second sending device to the device, and a network allocation vector NAV duration for which the second sending device occupies the radio resource; where the obtaining unit is further configured to obtain a receive antenna spatial correlation matrix of the device; and the determining unit is further configured to determine a receive vector, where the receive vector meets a first preset condition and a second preset condition, the first preset condition is: a channel statistical measurement value that is determined according to the receive vector determined by the determining unit and the receive antenna spatial correlation matrix obtained by the obtaining unit is less than a first preset value, and the second preset condition is: an interference measurement value that is determined according to the receive vector determined by the determining unit and the transmit effective channel vector obtained by the obtaining unit is less than a second preset value; and a communication unit, configured to communicate with a first sending device within a specified time by using the receive vector and the radio resource, where the specified time is an end time of the NAV duration.

According to a third aspect, an embodiment provides a device, where the device includes: a sensing unit, a determining unit, and a storage unit, where the determining unit is configured to: in a case in which the sensing unit senses that a sending device sends information to a receiving device by using a radio resource, determine a network allocation vector NAV entry corresponding to the sending device, where the NAV entry includes the following content: an identifier of the sending device, an interference source indication, an NAV duration for which the sending device occupies the radio resource, and an effective channel vector from the sending device to the device; and the storage unit is configured to store the NAV entry determined by the determining unit into an NAV table, so that the device accesses another device by using the NAV entry.

According to a fourth aspect, an embodiment provides an access method, where the method is applied to a communications system that uses a carrier sense multiple access technology, the method is executed by a first sending device, and the method includes: determining that N second receiving devices communicate with a second sending device by using a radio resource, where N is a positive integer greater than or equal to 1; obtaining a receive effective channel vector from each second receiving device to the first sending device, and a network allocation vector NAV duration for which each second receiving device occupies the radio resource; obtaining a transmit antenna spatial correlation matrix of the first sending device; determining M transmit vectors, where the M transmit vectors meet a first preset condition and a second preset condition, the first preset condition is: a channel statistical measurement value that is determined according to the M transmit vectors and the transmit antenna spatial correlation matrix is less than a first preset value, and the second preset condition is: all N interference measurement values that are determined according to the M transmit vectors and N receive effective channel vectors are less than a second preset value, where M is a positive integer greater than or equal to 1; and separately communicating with K first receiving devices within a specified time by using K of the M transmit vectors, where K is a positive integer less than or equal to M, and the specified time is an end time of the longest one of N NAV durations.

According to a fifth aspect, an embodiment provides an access method, where the method is applied to a communications system that uses a carrier sense multiple access technology, the method is executed by a first receiving device, and the method includes: determining that a second sending device communicates with N second receiving devices by using a radio resource; obtaining a transmit effective channel vector from the second sending device to the first receiving device, and a network allocation vector NAV duration for which the second sending device occupies the radio resource; obtaining a receive antenna spatial correlation matrix of the first receiving device; determining a receive vector, where the receive vector meets a first preset condition and a second preset condition, the first preset condition is: a channel statistical measurement value that is determined according to the receive vector and the receive antenna spatial correlation matrix is less than a first preset value, and the second preset condition is: an interference measurement value that is determined according to the receive vector and the transmit effective channel vector is less than a second preset value; and communicating with a first sending device within a specified time by using the receive vector and the radio resource, where the specified time is an end time of the NAV duration.

According to a sixth aspect, an embodiment provides an access method, where the method is executed by a first device, and the method includes: in a case of sensing that a sending device sends information to a receiving device by using a radio resource, determining a network allocation vector NAV entry corresponding to the sending device, where the NAV entry includes the following content: an identifier of the sending device, an interference source indication, an NAV duration for which the sending device occupies the radio resource, and an effective channel vector from the sending device to the first device; and storing the NAV entry into the NAV table so that the first device accesses another device by using the NAV entry.

According to the foregoing technical solutions, in a process in which a second sending device and N second receiving devices perform data transmission by using a radio resource, a first sending device and M first receiving devices can also perform data transmission by using the same radio resource. In addition, a process of data transmission between the first sending device and the M first receiving devices by using the same radio resource does not cause interference to data transmission between the second sending device and the N second receiving devices, nor receives interference from the second sending device and the N second receiving devices. Therefore, radio resource usage efficiency is effectively improved.

BRIEF DESCRIPTION OF DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

DESCRIPTION OF EMBODIMENTS

The following clearly describes the technical solutions in the embodiments with reference to the accompanying drawings in the embodiments. Apparently, the described embodiments are merely some but not all of the embodiments. All other embodiments obtained by a person of ordinary skill in the art based on the embodiments without creative efforts shall fall within the protection scope.

It should be understood that technical solutions in the embodiments may be applied to a communications system that uses a carrier sense multiple access (CSMA for short) technology. The communications system that uses the CSMA technology may be a wireless local area network (WLAN for short) that uses an unlicensed spectrum and uses the CSMA technology, for example, Wireless Fidelity (WiFi for short), and Worldwide interoperability for Microwave Access (WiMAX for short); or may be a mobile communications system that uses an unlicensed spectrum or a licensed spectrum and uses the CSMA technology, for example, a Global System for Mobile Communications (GSM for short) system, a Code Division Multiple Access (CDMA for short) system, a Wideband Code Division Multiple Access (WCDMA for short) system, general packet radio service (GPRS), a Long Term Evolution (LTE for short) system, an LTE frequency division duplex (FDD for short) system, LTE time division duplex (TDD for short), and a Universal Mobile Telecommunications System (UMTS for short).

An access point (AP for short) mentioned in the present invention may be a WLAN AP that uses an unlicensed spectrum, or may be a base station that uses an unlicensed spectrum or a licensed spectrum. The WLAN may be Wireless Fidelity (WiFi for short), or may be Worldwide interoperability for Microwave Access (WiMAX for short) and the like, which is not limited in the present invention. The base station that uses an unlicensed spectrum or a licensed spectrum may be a base transceiver station (BTS for short) in the GSM or the CDMA, or may be a NodeB in the WCDMA, or may be an eNB or an e-NodeB in the LTE, which is not limited in the present invention.

A station (STA for short) may be connected to the Internet by using the AP. The station may be a device having functions such as signal collection, data processing, and wireless communication. For example, the station may be a fixed terminal, or may be a mobile terminal (for example, a mobile phone and a computer that has a mobile terminal).

Figure 1:
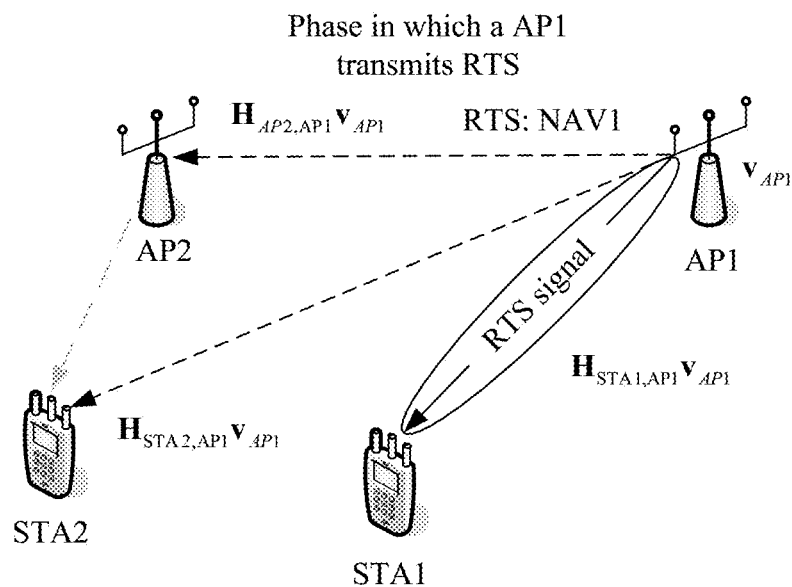
FIG. 1 is a working principle schematic diagram according to an embodiment.
Figure 2:
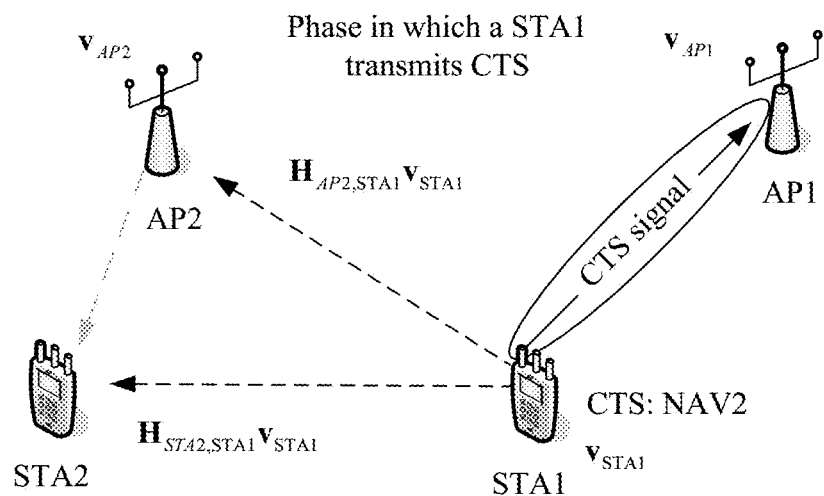
FIG. 2 is another working principle schematic diagram according to an embodiment.
Figure 3:
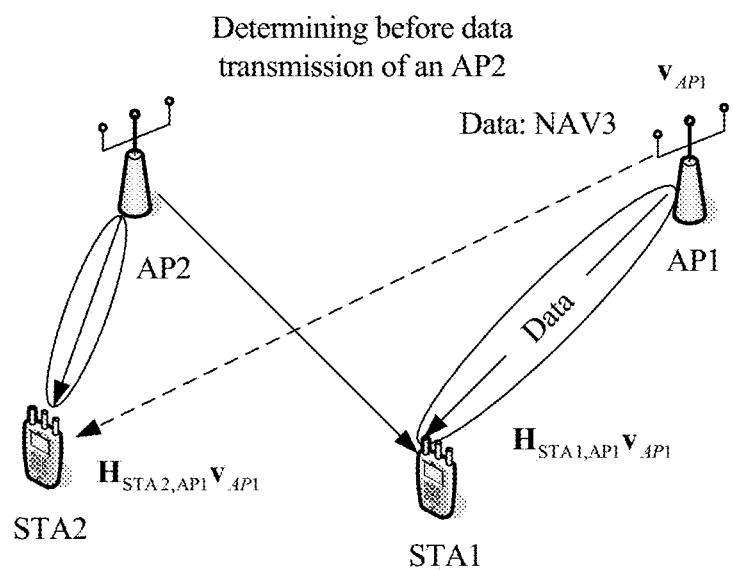
FIG. 3 is another working principle schematic diagram according to an embodiment.

FIG. 1 to FIG. 3 are working principle schematic diagrams according to the embodiments. Specifically, FIG. 1 to FIG. 3 are schematic diagrams of different phases. A communications system in FIG. 1 to FIG. 3 includes access points: an AP1 and an AP2, and stations: a STA1 and a STA2. The AP1 and the STA1 have established a transmission connection, and the present invention provides an establishment process of a transmission connection between the AP2 and the STA2 in the communications system.

In the communications system, the AP2 and the STA2 continuously sense a channel, and perform virtual carrier sensing and physical carrier sensing. Specifically, virtual carrier sensing refers to sensing all communication information during transmission connection establishment. The communication information includes request to send (RTS for short), clear to send (CTS for short), and a data header. For example, the RTS/CTS and the like are sensed and recorded by the AP2 and the STA2.

FIG. 1 is a working principle schematic diagram in a phase in which the AP1 transmits RTS according to an embodiment. In this phase, the AP2 or the STA2 or both perform clear channel assessment based on the RTS. Specifically, in a case in which the AP2 or the STA2 or both sense that the AP1 sends the RTS, the AP2 or the STA2 or both receive an RTS packet and parse a network allocation vector (NAV for short) duration carried in the RTS packet (it is assumed that the NAV duration carried in the RTS packet is an NAV1). In addition, the RTS packet includes a reference signal or a pilot. The AP2 or the STA2 or both may perform channel estimation according to the reference signal. By using the channel estimation, the AP2 may obtain a transmit effective channel vector $H_{AP2,AP1}v_{AP1}$. Similarly, the STA2 may obtain $H_{STA2,AP1}v_{AP1}$. The AP2 may store the NAV1 and the transmit effective channel vector $H_{AP2,AP1}v_{AP1}$ into a MIMO NAV table of the AP2. The STA2 may store the NAV1 and the transmit effective channel vector $H_{STA2,AP1}v_{AP1}$ into a MIMO NAV table of the STA2. The MIMO NAV table of the AP2 is shown in Table 1, and the MIMO NAV table of the STA2 is shown in Table 2.

TABLE 1

| | Channel protection duration | Effective channel vector |
|---|---|---|
| AP1 | NAV1 | $H_{AP2, AP1}v_{AP1}$ |

TABLE 2

| | Channel protection duration | Effective channel vector |
|---|---|---|
| AP1 | NAV1 | $H_{STA2, AP1}v_{AP1}$ |

For better understanding, the following describes a meaning of the transmit effective channel vector. For example, $H_{AP2,AP1}v_{AP1}$ includes a physical channel $H_{AP2,AP1}$ and a transmit precoding vector $v_{AP1}$. Assuming that a signal transmitted by the AP1 is s, s first passes the AP1 for transmit precoding $v_{AP1}$ (or referred to as transmit beamforming) and transmission by using multiple antennas. Assuming that a quantity of antennas of the AP is $N_{AP}$, $v_{AP1}$ is a vector $[v_{AP1}(1)\ v_{AP1}(2) \ldots v_{AP1}(N_{AP})]^T$ with N rows and one column. A form of the signal s sent on an $i^{th}$ antenna is $v_{AP1}$ (i)s. By transmitting coherent signals on the multiple antennas, a signal can be strengthened at a target STA, and weakened at a non-target STA. Therefore, the signal s first undergoes transmit precoding, and then arrives at each receive antenna of the AP2 through the physical channel. Generally, a coefficient of the channel that the signal s passes through constitutes the transmit effective channel vector $H_{AP2,AP1}v_{AP1}$.

The STA1 returns CTS to the AP1, and a schematic diagram of the system in this phase is shown in FIG. 2. In this phase, the AP2 or the STA2 or both may perform clear channel assessment based on the CTS. The clear channel assessment based on the CTS is similar to the clear channel assessment based on the RTS. When the STA1 returns the CTS to the AP1, the AP2 or the STA2 or both also obtain an NAV duration of a corresponding phase (it is assumed that the NAV duration carried in a CTS packet is an NAV2) and a receive effective channel vector. The AP2 stores an obtained NAV duration and a receive effective channel vector into a MIMO NAV table of the AP2. Similarly, the STA2 also stores an obtained NAV duration and a receive effective channel vector into a MIMO NAV table of the STA2. The MIMO NAV table of the AP2 is shown in Table 3, and the MIMO NAV table of the STA2 is shown in Table 4.

TABLE 3

| | Channel protection duration | Effective channel vector |
|---|---|---|
| AP1 | NAV1 | $H_{AP2, AP1}v_{AP1}$ |
| STA1 | NAV2 | $H_{AP2, STA1}v_{STA1}$ |

TABLE 4

| | Channel protection duration | Effective channel vector |
|---|---|---|
| AP1 | NAV1 | $H_{STA2, AP1}v_{AP1}$ |
| STA1 | NAV2 | $H_{STA2, STA1}v_{STA1}$ |

A person skilled in the art may understand that, when a system uses a same frequency band for communication in an uplink and a downlink, a channel has uplink and downlink reciprocity (English: reciprocity), that is $H_{STA1,AP2}=H_{AP2,STA1}^T$, and a transmit precoding vector $v_{STA1}$ and a receive processing vector $w_{STA1}$ that are used by the STA1 are the same. A physical meaning of the receive effective channel vector is a vector constituted by a coefficient obtained after a signal sent by a transmitter is processed by a physical channel and a receive processing vector of a receiver. Therefore, the receive effective channel vector from the AP2 to the STA1 may be indicated as $w_{STA1}{}^H H_{STA1,AP2}$ or $w_{STA1}{}^T H_{STA1,AP2}$, or equivalently and dually indicated as $H_{AP2,STA1} v_{STA1}$. Similarly, the receive effective channel vector from the STA2 to the STA1 may be indicated as $w_{STA1}{}^{1H} H_{STA1,STA2}$ or $w_{STA1}{}^T H_{STA1,STA2}$, or equivalently and dually indicated as $H_{STA2,STA1} v_{STA1}$.

When performing the virtual carrier sensing, the AP2 performs the physical carrier sensing at the same time and obtains an antenna spatial correlation matrix $R_{AP2}$ of the AP2. The STA2 also performs the physical carrier sensing and obtains an antenna spatial correlation matrix $R_{STA2}$ of the STA2. In a case in which the AP2 is used as a sending device to communicate with the STA2, $R_{AP2}$ may also be referred to as a transmit antenna spatial correlation matrix, and $R_{STA2}$ may also be referred to as a receive antenna spatial correlation matrix.

After performing the virtual carrier sensing and the physical carrier sensing, the system may make a transmission decision. FIG. 3 is a schematic diagram of making a transmission decision according to an embodiment. Specifically, when the AP2 needs to transmit data (for example, sends RTS), the AP2 determines, based on a result of the foregoing sensing, whether a channel is available. When the STA2 needs to determine whether to return CTS, the AP2 determines, based on a result of the foregoing sensing, whether a channel is available. For specific details, refer to descriptions of other embodiments.

Figure 4:
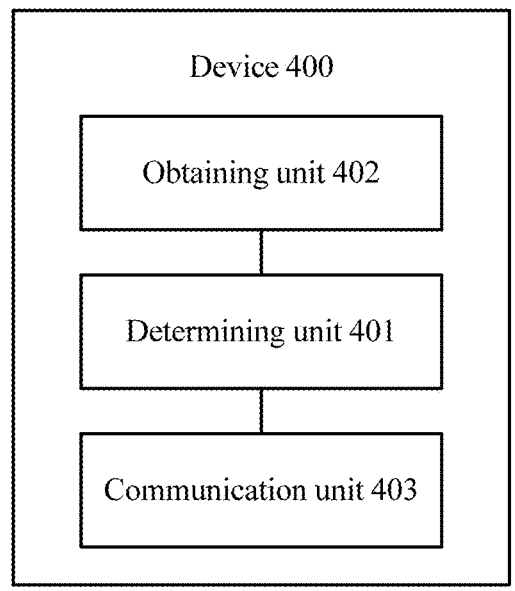
FIG. 4 is a structural block diagram of a device according to an embodiment.

FIG. 4 is a structural block diagram of a device according to an embodiment. A device 400 shown in FIG. 4 supports a carrier sense multiple access technology, and may be an AP2 or a STA2 in FIG. 1 to FIG. 3. For ease of description, the device 400 may be referred to as a first sending device. The device 400 includes a determining unit 401, an obtaining unit 402, and a communication unit 403.

The determining unit 401 is configured to determine that N second receiving devices communicate with a second sending device by using a radio resource, where N is a positive integer greater than or equal to 1.

The obtaining unit 402 is configured to obtain a receive effective channel vector from each second receiving device to the device 400, and a network allocation vector (English: Network Allocation Vector, NAV for short) duration for which each second receiving device occupies the radio resource.

The obtaining unit 402 is further configured to obtain a transmit antenna spatial correlation matrix of the device 400.

The determining unit 401 is further configured to determine M transmit vectors, where the M transmit vectors meet a first preset condition and a second preset condition, the first preset condition is: a channel statistical measurement value that is determined according to the M transmit vectors determined by the determining unit 401 and the transmit antenna spatial correlation matrix obtained by the obtaining unit 402 is less than a first preset value, and the second preset condition is: all N interference measurement values that are determined according to the M transmit vectors determined by the determining unit 401 and N receive effective channel vectors obtained by the obtaining unit 402 are less than a second preset value, where M is a positive integer greater than or equal to 1.

The communication unit 403 is configured to separately communicate with K first receiving devices within a specified time by using K of the M transmit vectors determined by the determining unit 402 and the radio resource, where K is a positive integer less than or equal to M, and the specified time is an end time of the longest one of N NAV durations.

When a radio resource is occupied by a second sending device and a second receiving device, the device 400 shown in FIG. 4 can determine a proper transmit vector and send data to a first receiving device by using the determined transmit vector and the radio resource. Moreover, when sending the data to the first receiving device by using the transmit vector and the radio resource, the device 400 causes no interference to communication between the second sending device and the second receiving device. Therefore, radio resource usage efficiency can be improved.

Specifically, the obtaining unit 402 is specifically configured to read the receive effective channel vector from each second receiving device to the device 400 in an NAV table, where the receive effective channel vector from each second receiving device to the device 400 in the NAV table is obtained by the obtaining unit 402 in the following manner: obtaining information sent by each second receiving device, and determining, according to the information sent by each second receiving device, the receive effective channel vector from each second receiving device to the device 400.

Specifically, the determining unit 401 is specifically configured to determine the channel statistical measurement value in the following manner:

$$CHM = V_{A1}{}^H R_{A1} V_{A1} \qquad \text{Formula 1.1, where}$$

CHM indicates the channel statistical measurement value, $V_{A1}$ indicates a transmit matrix consisting of the M transmit vectors, $V_{A1}{}^H$ indicates a conjugate of the transmit matrix $V_{A1}$, and $R_{A1}$ indicates the transmit antenna spatial correlation matrix.

Specifically, the determining unit 401 is specifically configured to determine any one of the N interference measurement values in the following manner:

$$IM = |w_{A2}{}^H H_{A2,A1} V_{A1}|^2 \times P_{A1} \qquad \text{Formula 1.2, where}$$

$w_{A2}{}^H H_{A2,A1}$ indicates a receive effective channel vector from any one of the N second receiving devices to the device, $w_{A2}{}^H$ indicates a conjugate of a receive vector of the any second receiving device, $H_{A2,A1}$ indicates a channel matrix from the any second receiving device to the device, $V_{A1}$ indicates the transmit matrix consisting of the M transmit vectors, $P_{A1}$ indicates transmit power of the device, and IM indicates an interference measurement value corresponding to the any second receiving device.

Optionally, in an embodiment, the determining 401 may be further configured to determine the M transmit vectors according to the NAV duration for which each second receiving device occupies the radio resource.

Specifically, the determining unit 401 may be configured to: determine an NAV duration for which the device 400 occupies the radio resource; determine, according to the NAV duration for which the device 400 occupies the radio resource and the NAV duration for which each second receiving device occupies the radio resource, an effective interference time of the device 400 corresponding to each second receiving device; and determine the M transmit vectors according to the effective interference time of the device 400 corresponding to each second receiving device and the receive effective channel vector from each second receiving device to the device 400.

The first sending device shown in FIG. 4 can send data to K first receiving devices by using a selected proper transmit vector, and when sending the data, the first sending device causes no interference to a connection that has been established between the second sending device and the second receiving device. Likewise, by using a selected proper receive vector, the first receiving device can also avoid interference caused by the second sending device to the first receiving device.

Figure 5:
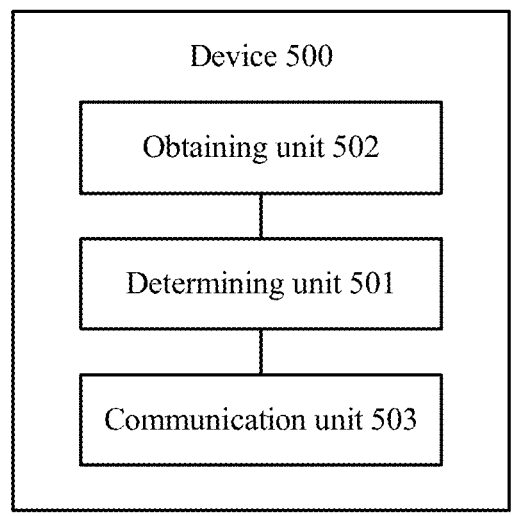
FIG. 5 is a structural block diagram of another device according to an embodiment.

FIG. 5 is a structural block diagram of another device according to an embodiment. A device 500 shown in FIG. 5 supports a carrier sense multiple access technology, and may be an AP2 or a STA2 in FIG. 1 to FIG. 3. The device 500 is a first receiving device that communicates with the device 400 shown in FIG. 4. The device 500 includes a determining unit 501, an obtaining unit 502, and a communication unit 503.

The determining unit 501 is configured to determine that a second sending device communicates with N second receiving devices by using a radio resource.

The obtaining unit 502 is configured to obtain a transmit effective channel vector from the second sending device to the device 500 and an NAV duration for which the second sending device occupies the radio resource.

The obtaining unit 502 is further configured to obtain a receive antenna spatial correlation matrix of the device 500.

The determining unit 501 is further configured to determine a receive vector, where the receive vector meets a first preset condition and a second preset condition, the first preset condition is: a channel statistical measurement value that is determined according to the receive vector determined by the determining unit 501 and the receive antenna spatial correlation matrix obtained by the obtaining unit 502 is less than a first preset value, and the second preset condition is: an interference measurement value that is determined according to the receive vector determined by the determining unit 501 and the transmit effective channel vector obtained by the obtaining unit 502 is less than a second preset value.

The communication unit 503 is configured to communicate with a first sending device within a specified time by using the receive vector determined by the determining unit 501 and the radio resource, where the specified time is an end time of the NAV duration.

When a radio resource is occupied by a second sending device and a second receiving device, the device 500 shown in FIG. 5 can determine a proper receive vector and receive data from a first sending device by using the determined receive vector and the radio resource. Moreover, when receiving the data from the first sending device by using the radio resource, the device 500 is not interfered by the second sending device. Therefore, radio resource usage efficiency is improved.

Specifically, the obtaining unit 502 is specifically configured to read the transmit effective channel vector in an NAV table, where the transmit effective channel vector in the NAV table is obtained by the obtaining unit 502 in the following manner: obtaining information sent by the second sending device, and determining the transmit effective channel vector according to the information sent by the second sending device.

Specifically, the determining unit 501 is specifically configured to determine the channel statistical measurement value in the following manner:

$$\mathrm{CHM} = w_{A1}^H R_{A1} w_{A1} \qquad \text{Formula 1.3, where}$$

CHM indicates the channel statistical measurement value, $w_{A1}$ indicates the receive vector, $w_{A1}^H$ indicates a conjugate of the receive vector $w_{A1}$, and $R_{A1}$ indicates the receive antenna spatial correlation matrix.

Specifically, the determining unit 501 is specifically configured to determine the interference measurement value in the following manner:

$$\mathrm{IM} = |w_{A1}^H H_{A1,A3} v_{A3}|^2 \times P_{A3} \qquad \text{Formula 1.4, where}$$

IM indicates the interference measurement value, $H_{A1,A3} v_{A3}$ indicates the transmit effective channel vector, $H_{A1,A3}$ indicates a channel matrix from the second sending device to the device 500, $v_{A3}$ indicates a transmit vector of the second sending device, $w_{A1}$ indicates the receive vector, and $P_{A3}$ indicates transmit power of the second sending device.

In a case in which the first sending device shown in FIG. 4 is an AP, the first receiving device shown in FIG. 5 may be a STA. In a case in which the first sending device shown in FIG. 4 is a STA, the first receiving device shown in FIG. 5 may be an AP. Moreover, because both an AP and a STA may be used as a sending device, or may be used as a receiving device, the first sending device shown in FIG. 4 and the first receiving device shown in FIG. 5 may also be a same device.

Figure 6:
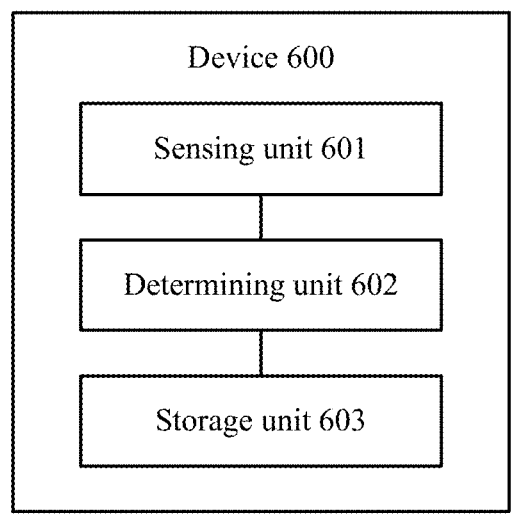
FIG. 6 is a structural block diagram of another device according to an embodiment.

FIG. 6 is a structural block diagram of another device according to an embodiment. The device shown in FIG. 6 may be the first sending device shown in FIG. 4, or may also be the first receiving device shown in FIG. 5. As shown in FIG. 6, a device 600 includes a sensing unit 601, a determining unit 602, and a storage unit 603.

The determining unit 602 is configured to: in a case in which the sensing unit 601 senses that a sending device sends information to a receiving device by using a radio resource, determine an NAV entry corresponding to the sending device, where the NAV entry includes the following content: an identifier of the sending device, an interference source indication, an NAV duration for which the sending device occupies the radio resource, and an effective channel vector from the sending device to the device 600.

The storage unit 603 is configured to store the NAV entry determined by the determining unit 602 into an NAV table, so that the device accesses another device by using the NAV entry.

According to the device shown in FIG. 6, the device 600 can determine an entry in the NAV table. When the device 600 needs to access another device, the device 600 may directly use the entry in the NAV table to determine a parameter that needs to be used. For example, the device may use an effective channel vector in the entry to determine a parameter that needs to be used by the device 600, for example, a transmit vector and/or a receive vector.

Optionally, in an embodiment, the determining unit 602 is specifically configured to: in a case in which the sensing unit 601 senses that the information sent by the sending device is data information or request to send (English: Request To Send, RTS for short) information, determine a transmit effective channel vector from the sending device to the device 600 according to the sensed information. Further, in this case, the determining unit 602 may further determine that the sending device is an interference source.

Optionally, in another embodiment, the determining unit 602 is specifically configured to: in a case in which the sensing unit 601 senses that the information sent by the sending device is clear to send (English: Clear To Send, CTS for short) information, determine a receive effective channel vector from the sending device to the device 600 according to the sensed information. Further, in this case, the determining unit 602 may further determine that the sending device is a non-interference source.

Further, the method further includes: the storage unit 603, further configured to delete the NAV entry from the NAV table in a case in which a current time determined by the determining unit 602 exceeds a sum of a time for creating the NAV entry and the NAV duration for which the sending device occupies the radio resource.

Figure 7:
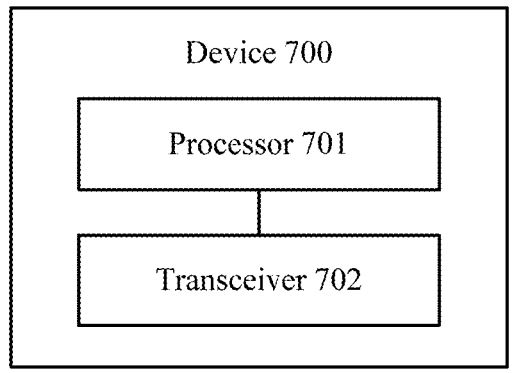
FIG. 7 is a structural block diagram of another device according to an embodiment.

FIG. 7 is a structural block diagram of another device according to an embodiment. A device 700 shown in FIG. 7 supports a carrier sense multiple access technology, and may be an AP2 or a STA2 in FIG. 1 to FIG. 3. For ease of description, the device 700 may be referred to as a first sending device. The device 700 includes a processor 701 and a transceiver 702.

The processor 701 is configured to determine that N second receiving devices communicate with a second sending device by using a radio resource, where N is a positive integer greater than or equal to 1.

The processor 701 is further configured to obtain a receive effective channel vector from each second receiving device to the device 700, and a network allocation vector (English: Network Allocation Vector, NAV for short) duration for which each second receiving device occupies the radio resource.

The processor 701 is further configured to obtain a transmit antenna spatial correlation matrix of the device 700.

The processor 701 is further configured to determine M transmit vectors, where the M transmit vectors meet a first preset condition and a second preset condition, the first preset condition is: a channel statistical measurement value that is determined according to the M transmit vectors determined by the processor 701 and the transmit antenna spatial correlation matrix obtained by the processor 701 is less than a first preset value, and the second preset condition is: all N interference measurement values that are determined according to the M transmit vectors determined by the processor 701 and N receive effective channel vectors obtained by the processor 701 are less than a second preset value, where M is a positive integer greater than or equal to 1.

The transceiver 702 is configured to separately communicate with K first receiving devices within a specified time by using K of the M transmit vectors determined by the processor 701 and the radio resource, where K is a positive integer less than or equal to M, and the specified time is an end time of the longest one of N NAV durations.

When a radio resource is occupied by a second sending device and a second receiving device, the device 700 shown in FIG. 7 can determine a proper transmit vector and send data to a first receiving device by using the determined transmit vector and the radio resource. Moreover, when sending the data to the first receiving device by using the transmit vector and the radio resource, the device 700 causes no interference to communication between the second sending device and the second receiving device. Therefore, radio resource usage efficiency can be improved.

Specifically, the processor 701 is specifically configured to read the receive effective channel vector from each second receiving device to the device 700 in an NAV table, where the receive effective channel vector from each second receiving device to the device 700 in the NAV table is obtained by processor 701 in the following manner: obtaining information sent by each second receiving device, and determining, according to the information sent by each second receiving device, the receive effective channel vector from each second receiving device to the device 700.

Specifically, the processor 701 is specifically configured to determine the channel statistical measurement value in the following manner:

$$CHM = V_{A1}^H R_{A1} V_{A1} \qquad \text{Formula 1.5, where}$$

CHM indicates the channel statistical measurement value, $V_{A1}$ indicates a transmit matrix consisting of the M transmit vectors, $V_{A1}^H$ indicates a conjugate of the transmit matrix $V_{A1}$, and $R_{A1}$ indicates the transmit antenna spatial correlation matrix.

Specifically, the processor 701 is specifically configured to determine any one of the N interference measurement values in the following manner:

$$IM = |w_{A2}^H H_{A2,A1} V_{A1}|^2 \times P_{A1} \qquad \text{Formula 1.6, where}$$

$w_{A2}^H H_{A2,A1}$ indicates a receive effective channel vector from any one of the N second receiving devices to the device, $w_{A2}^H$ indicates a conjugate of a receive vector of the any second receiving device, $H_{A2,A1}$ indicates a channel matrix from the any second receiving device to the device, $V_{A1}$ indicates the transmit matrix consisting of the M transmit vectors, $P_{A1}$ indicates transmit power of the device, and IM indicates an interference measurement value corresponding to the any second receiving device.

Optionally, in an embodiment, the processor 701 may be further configured to determine the M transmit vectors according to the NAV duration for which each second receiving device occupies the radio resource.

Specifically, the processor 701 may be configured to: determine an NAV duration for which the device 700 occupies the radio resource; determine, according to the NAV duration for which the device 700 occupies the radio resource and the NAV duration for which each second receiving device occupies the radio resource, an effective interference time of the device 700 corresponding to each second receiving device; and determine the M transmit vectors according to the effective interference time of the device 700 corresponding to each second receiving device and the receive effective channel vector from each second receiving device to the device 700.

The first sending device shown in FIG. 7 can send data to the K first receiving devices by using a selected proper transmit vector, and when sending the data, the first sending device causes no interference to a connection that has been established between the second sending device and the second receiving device. Likewise, by using a selected proper receive vector, the first receiving device can also avoid interference caused by the second sending device to the first receiving device.

Figure 8:
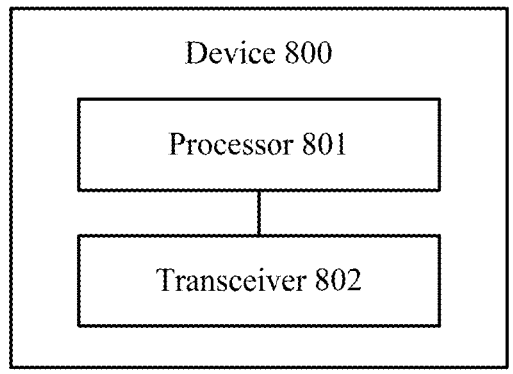
FIG. 8 is a structural block diagram of another device according to an embodiment.

FIG. 8 is a structural block diagram of another device according to an embodiment. A device 800 shown in FIG. 8 supports a carrier sense multiple access technology, and may be an AP2 or a STA2 in FIG. 1 to FIG. 3. The device 800 is a first receiving device that communicates with the device 700 shown in FIG. 7. The device 800 includes a processor 801 and a transceiver 802.

The processor 801 is configured to determine that a second sending device communicates with N second receiving devices by using a radio resource.

The processor 801 is configured to obtain a transmit effective channel vector from the second sending device to the device 800 and an NAV duration for which the second sending device occupies the radio resource.

The processor 801 is further configured to obtain a receive antenna spatial correlation matrix of the device 800.

The processor 801 is further configured to determine a receive vector, where the receive vector meets a first preset condition and a second preset condition, the first preset condition is: a channel statistical measurement value that is determined according to the receive vector determined by the processor 801 and the receive antenna spatial correlation matrix obtained by the processor 801 is less than a first preset value, and the second preset condition is: an interference measurement value that is determined according to the receive vector determined by the processor 801 and the transmit effective channel vector obtained by the processor 801 is less than a second preset value.

The transceiver 802 is configured to communicate with a first sending device within a specified time by using the receive vector determined by the processor 801 and the radio resource, where the specified time is an end time of the NAV duration.

When a radio resource is occupied by a second sending device and a second receiving device, the device 800 shown in FIG. 8 can determine a proper receive vector and receive data from a first sending device by using the determined receive vector and the radio resource. Moreover, when receiving the data from the first sending device by using the radio resource, the device 800 is not interfered by the second sending device. Therefore, radio resource usage efficiency is improved.

Specifically, the processor 801 is specifically configured to read the transmit effective channel vector in an NAV table, where the transmit effective channel vector in the NAV table is obtained by the processor 801 in the following manner: obtaining information sent by the second sending device, and determining the transmit effective channel vector according to the information sent by the second sending device.

Specifically, the processor 801 is specifically configured to determine the channel statistical measurement value in the following manner:

$$CHM = w_{A1}^H R_{A1} w_{A1} \quad \text{Formula 1.7, where}$$

CHM indicates the channel statistical measurement value, $w_{A1}$ indicates the receive vector, $w_{A1}^H$ indicates a conjugate of the receive vector $w_{A1}$, and $R_{A1}$ indicates the receive antenna spatial correlation matrix.

Specifically, the processor 801 is specifically configured to determine the interference measurement value in the following manner:

$$IM = |w_{A1}^H H_{A1,A3} v_{A3}|^2 \times P_{A3} \quad \text{Formula 1.8, where}$$

IM indicates the interference measurement value, $H_{A1,A3} v_{A3}$ indicates the transmit effective channel vector, $H_{A1,A3}$ indicates a channel matrix from the second sending device to the device 800, $v_{A3}$ indicates a transmit vector of the second sending device, $w_{A1}$ indicates the receive vector, and $P_{A3}$ indicates transmit power of the second sending device.

In a case in which the first sending device shown in FIG. 7 is an AP, the first receiving device shown in FIG. 8 may be a STA. In a case in which the first sending device shown in FIG. 7 is a STA, the first receiving device shown in FIG. 8 may be an AP. Moreover, because both an AP and a STA may be used as a sending device, or may be used as a receiving device, the first sending device shown in FIG. 7 and the first receiving device shown in FIG. 8 may also be a same device.

Figure 9:
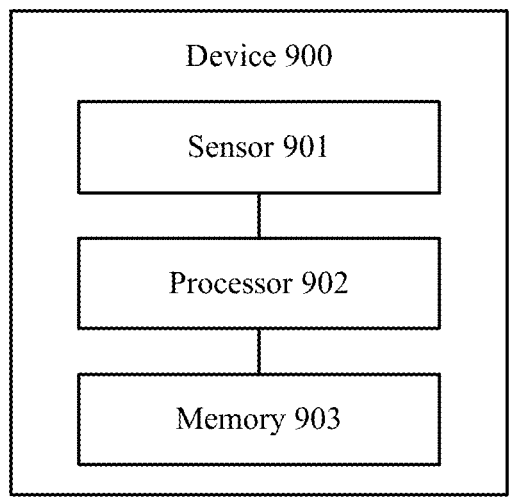
FIG. 9 is a structural block diagram of another device according to an embodiment.

FIG. 9 is a structural block diagram of another device according to an embodiment. The device shown in FIG. 9 may be the first sending device shown in FIG. 7, or may also be the first receiving device shown in FIG. 8. As shown in FIG. 9, a device 900 includes a sensor 901, a processor 902, and a memory 903.

The processor 902 is configured to: in a case in which the sensor 901 senses that a sending device sends information to a receiving device by using a radio resource, determine an NAV entry corresponding to the sending device, where the NAV entry includes the following content: an identifier of the sending device, an interference source indication, an NAV duration for which the sending device occupies the radio resource, and an effective channel vector from the sending device to the device 900.

The memory 903 is configured to store the NAV entry determined by the processor 902 into an NAV table, so that the device accesses another device by using the NAV entry.

According to the apparatus shown in FIG. 9, the device 900 can determine an entry in the NAV table. When the device 900 needs to access another device, the device 900 may directly use the entry in the NAV table to determine a parameter that needs to be used. For example, the device may use an effective channel vector in the entry to determine a parameter that needs to be used by the device 900, for example, a transmit vector and/or a receive vector.

Optionally, in an embodiment, the processor 902 is specifically configured to: in a case in which the sensor 901 senses that the information sent by the sending device is data information or request to send (English: Request To Send, RTS for short) information, determine a transmit effective channel vector from the sending device to the device 900 according to the sensed information. Further, in this case, the processor 902 may further determine that the sending device is an interference source.

Optionally, in another embodiment, the processor 902 is specifically configured to: in a case in which the sensor 901 senses that the information sent by the sending device is clear to send (English: Clear To Send, CTS for short) information, determine a receive effective channel vector from the sending device to the device 900 according to the sensed information. Further, in this case, the processor 902 may further determine that the sending device is a non-interference source.

Further, the method further includes: a memory 903, further configured to delete the NAV entry from the NAV table in a case in which a current time determined by the processor 902 exceeds a sum of a time for creating the entry and the NAV duration for which the sending device occupies the radio resource.

Figure 10:
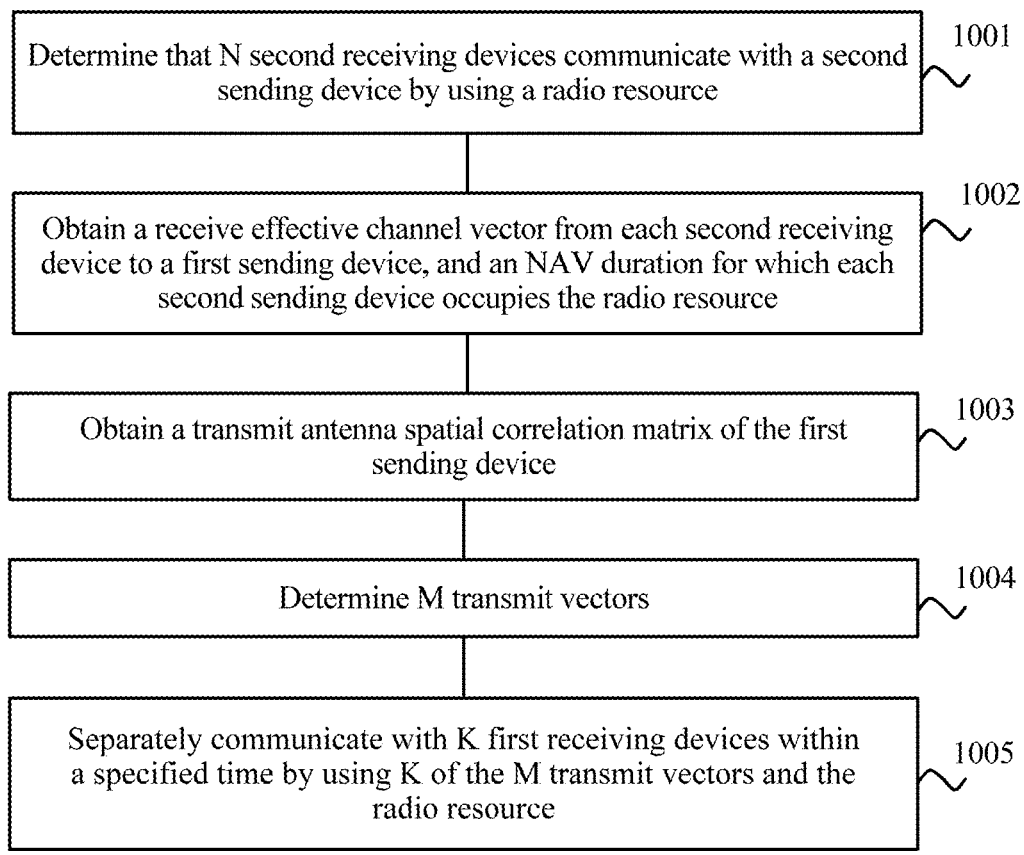
FIG. 10 is a schematic flowchart of an access method according to an embodiment.

FIG. 10 is a schematic flowchart of an access method according to an embodiment. The method shown in FIG. 10 is executed by a first sending device. The method shown in FIG. 10 can be applied to a communications system that uses a CSMA technology. The device 400 shown in FIG. 4 may be the first sending device to execute the method shown in FIG. 10.

1001. Determine that N second receiving devices communicate with a second sending device by using a radio resource, where N is a positive integer greater than or equal to 1.

1002. Obtain a receive effective channel vector from each second receiving device to the first sending device, and an NAV duration for which each second receiving device occupies the radio resource.

1003. Obtain a transmit antenna spatial correlation matrix of the first sending device.

1004. Determine M transmit vectors, where the M transmit vectors meet a first preset condition and a second preset condition, the first preset condition is: a channel statistical measurement value that is determined according to the M transmit vectors and the transmit antenna spatial correlation matrix is less than a first preset value, and the second preset condition is: all N interference measurement values that are determined according to the M transmit vectors and N receive effective channel vectors are less than a second preset value, where M is a positive integer greater than or equal to 1.

1005. Separately communicate with K first receiving devices within a specified time by using K of the M transmit vectors and the radio resource, where K is a positive integer less than or equal to M, and the specified time is an end time of the longest one of N NAV durations.

According to the method shown in FIG. 10, when a radio resource is occupied by a second sending device and a second receiving device, a first sending device can determine a proper transmit vector and send data to a first receiving device by using the determined transmit vector and the radio resource. Moreover, when sending the data to the first receiving device by using the transmit vector and the radio resource, the first sending device causes no interference to communication between the second sending device and the second receiving device. Therefore, radio resource usage efficiency can be improved.

The first sending device can send data to the K first receiving devices by using a selected proper transmit vector, and when sending the data, the first sending device causes no interference to a connection that has been established between the second sending device and the second receiving device. Likewise, by using a selected proper receive vector, the first receiving device can also avoid interference caused by the second sending device to the first receiving device.

Figure 11:
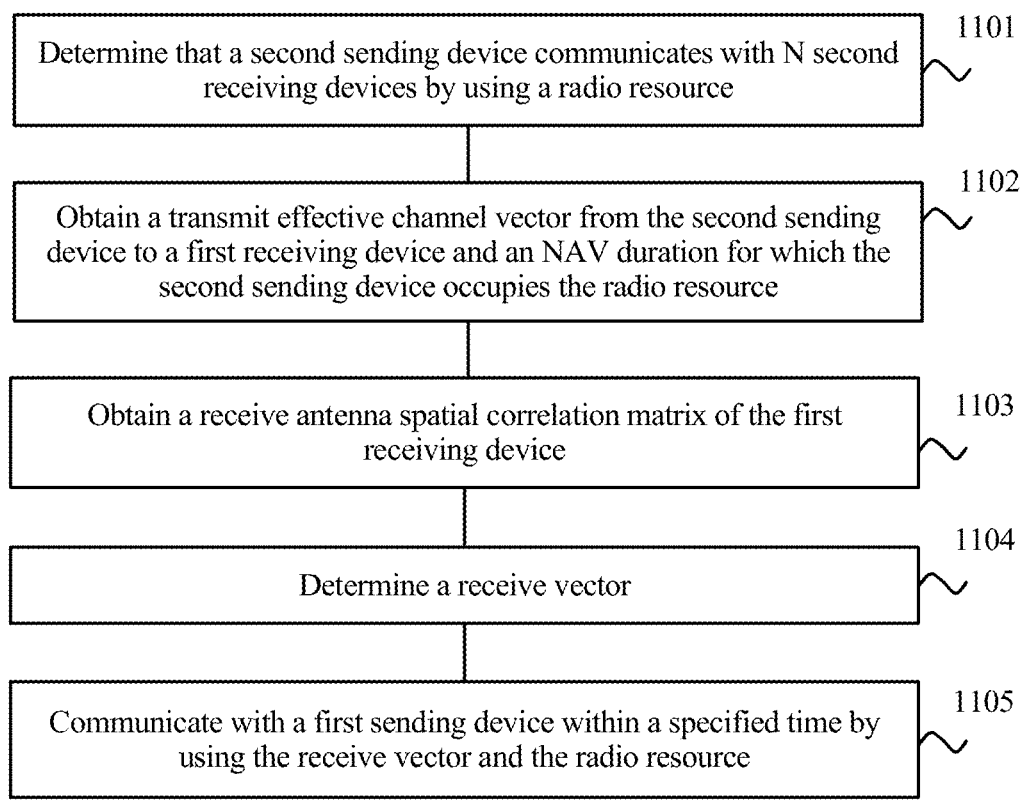
FIG. 11 is a schematic flowchart of another access method according to an embodiment.

FIG. 11 is a schematic flowchart of another access method according to an embodiment. The method shown in FIG. 11 is executed by a first receiving device. The method shown in FIG. 11 can be applied to a communications system that uses a CSMA technology. The device 500 shown in FIG. 5 may be the first receiving device to execute the method shown in FIG. 11.

1101. Determine that a second sending device communicates with N second receiving devices by using a radio resource.

1102. Obtain a transmit effective channel vector from the second sending device to the first receiving device and an NAV duration for which the second sending device occupies the radio resource.

1103. Obtain a receive antenna spatial correlation matrix of the first receiving device.

1104. Determine a receive vector, where the receive vector meets a first preset condition and a second preset condition, the first preset condition is: a channel statistical measurement value that is determined according to the receive vector and the receive antenna spatial correlation matrix is less than a first preset value, and the second preset condition is: an interference measurement value that is determined according to the receive vector and the transmit effective channel vector is less than a second preset value.

1105. Communicate with the first sending device within a specified time by using the receive vector and the radio resource, where the specified time is an end time of the NAV duration.

According to the method shown in FIG. 11, when a radio resource is occupied by a second sending device and a second receiving device, a first receiving device can determine a proper receive vector and receive data from a first sending device by using the determined receive vector and the radio resource. Moreover, when receiving the data from the first sending device by using the radio resource, the first receiving device is not interfered by the second sending device. Therefore, radio resource usage efficiency is improved.

Figure 12:
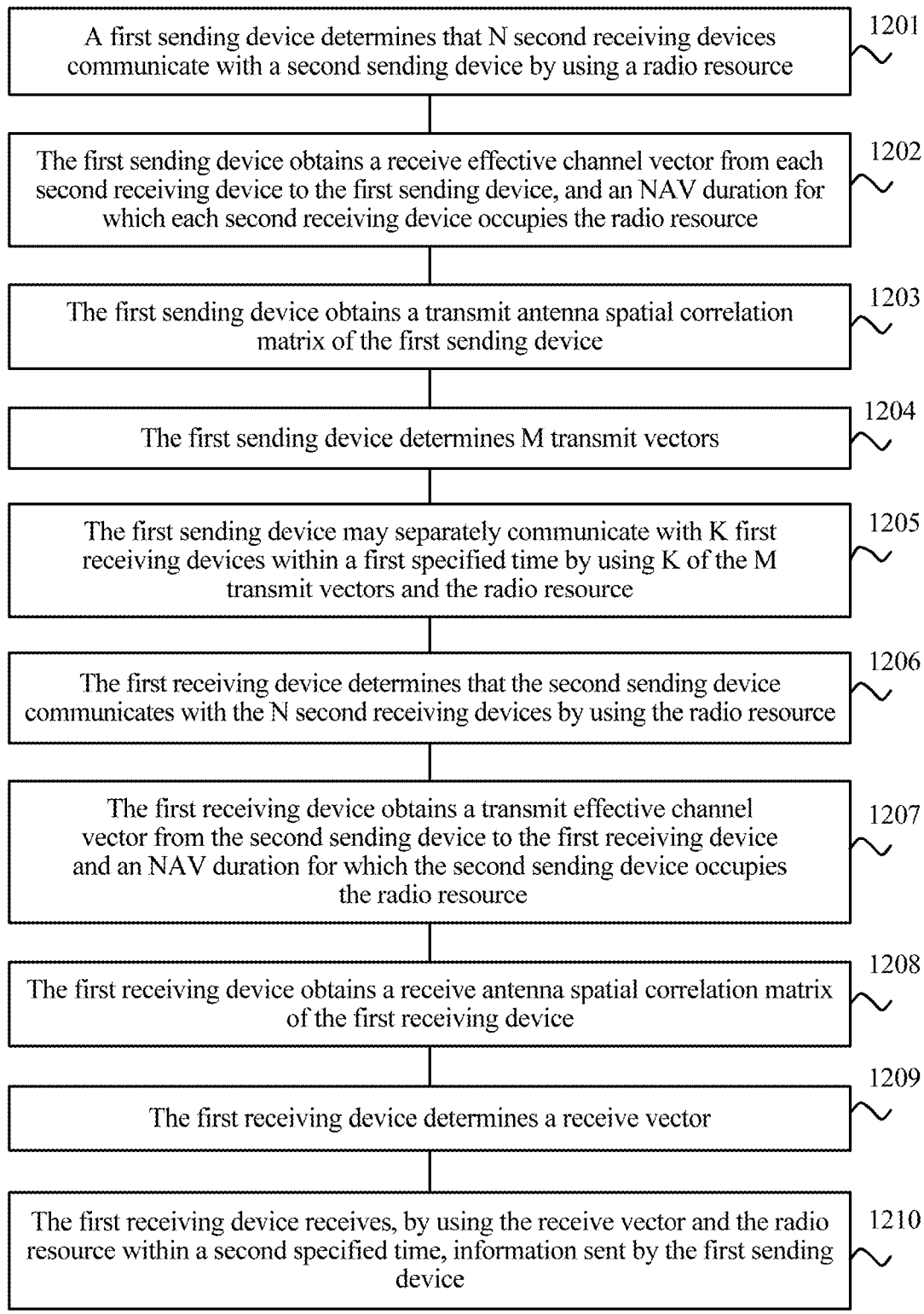
FIG. 12 is a schematic diagram of another access method according to an embodiment.

FIG. 12 is a schematic diagram of another access method according to an embodiment. The method shown in FIG. 12 is a specific embodiment of the methods shown in FIG. 10 and FIG. 11.

1201. A first sending device determines that N second receiving devices communicate with a second sending device by using a radio resource, where N is a positive integer greater than or equal to 1.

Optionally, the first sending device may determine, in a case of sensing that the second sending device sends data information to the N second receiving devices by using the radio resource, that the N second receiving devices communicate with the second sending device by using the radio resource. The data information includes a preamble sequence. The first sending device can determine both communication parties according to the preamble sequence. The first sending device may further determine, in a case of sensing that the N second receiving devices send CTS to the second sending device by using the radio resource, that the N second receiving devices communicate with the second sending device by using the radio resource.

1202. The first sending device obtains a receive effective channel vector from each second receiving device to the first sending device, and an NAV duration for which each second receiving device occupies the radio resource.

The receive effective channel vector from each second receiving device to the first sending device is a product of a receive vector w of each second receiving device and a channel matrix H from each second receiving device to the first sending device.

Optionally, in an embodiment, the first sending device may read the receive effective channel vector in an NAV table (that is, a MIMO NAV table).

The receive effective channel vector in the NAV table may be obtained in the following manner: the first sending device obtains information sent by each second receiving device, and determines, according to the information sent by the second receiving device, the receive effective channel vector from each second receiving device to the first sending device. Specifically, the information sent by the second receiving device may be control information (for example, CTS), or may be data information. The first receiving device may determine the receive effective channel vector from each second receiving device to the first sending device in a measurement manner.

Generally, the first sending device continuously senses a signal, and can determine the NAV duration in the information after sensing the information sent by each second receiving device. The NAV duration is used to indicate duration for which each second receiving device occupies the radio resource to send the information. The first sending device senses the information sent by each second receiving device according to the NAV duration of each second receiving device, and determines the receive effective channel vector from each second receiving device to the first sending device according to the information sent by each second receiving device. For example, the receive effective channel vector from each second receiving device to the first sending device can be determined in a measurement manner. The first sending device may store the receive effective channel vector from each second receiving device to the first sending device into the NAV table. The first sending device may further store the NAV duration of each second receiving device into the NAV table. Further, the first sending device may further delete, from the NAV table, an entry of a second receiving device whose NAV expires. In addition, the NAV table may further include an interference source indication, and the interference source indication is used to indicate whether a corresponding device is an interference source. The interference source indication of each second receiving device is no. In this case, the first sending device may directly select a receive effective channel vector and an NAV duration that are corresponding to an entry whose interference source indication is no.

Each NAV entry in the NAV table of the first sending device may be corresponding to a device that occupies the radio resource, and the entry may include the following content: an identifier of the device that occupies the radio resource, an interference source indication, an NAV duration of the device that occupies the radio resource, and an effective channel vector from the device that occupies the radio resource to the first sending device.

Table 5 is a schematic diagram of an entry corresponding to A2 in the NAV table stored by the first sending device according to this embodiment.

TABLE 5

| Channel holder | Interference source indication | NAV duration | Effective channel vector |
|---|---|---|---|
| A2 | N | NAV1 | $w_{A2}{}^H H_{A2,A1}$ |

In Table 5, content for the "channel holder" is A2, which indicates that the device that occupies the radio resource is the A2. Content for the "interference source indication" is N, which indicates that the A2 is not an interference source. Content for the "NAV duration" is NAV1, which indicates duration for which the A2 occupies the radio resource is the NAV1. Content for the "effective channel vector" is $w_{A2}{}^H H_{A2,A1}$, which indicates a value of the effective channel vector from the device A2 to the first sending device is $w_{A2}{}^H H_{A2,A1}$.

It may be understood that Table 5 is merely a schematic diagram of one NAV table. A person skilled in the art may understand that, a correspondence among each second receiving device, the effective channel vector value, the NAV duration and whether the second receiving device is an interference source may be stored in the first sending device by another manner. The present invention sets no limitation.

Optionally, in another embodiment, the first sending device may further determine the receive effective channel vector from each second receiving device to the first sending device. For example, the first sending device may determine the receive effective channel vector from each second receiving device to the first sending device in a measurement manner. Specifically, in a case in which the first sending device senses that the second sending device sends RTS information to multiple devices and senses that the N second receiving devices send CTS to the second sending device, the first sending device may determine the receive effective channel vector from each second receiving device to the first sending device by obtaining CTS information sent by the N second receiving devices to the second sending device. At the same time, the first sending device may determine the NAV duration for which each second receiving device occupies the radio resource. After determining N receive effective channel vectors, the first sending device may store the N receive effective channel vectors and corresponding N NAV durations into the NAV table. For another example, in a case in which the first sending device senses that the second sending device sends data information to the N second receiving devices, the first sending device may determine the receive effective channel vector from each second receiving device to the first sending device according to history information sent by each second receiving device, where the history information sent by each second receiving device indicates content sent by each second receiving device before the first sending device senses that the second sending device sends the data information. Further, the first sending device may further delete, from the NAV table, an entry of a second receiving device whose NAV expires. In addition, the NAV table may further include an interference source indication, and the interference source indication is used to indicate whether a corresponding device is an interference source.

1203. The first sending device obtains a transmit antenna spatial correlation matrix of the first sending device.

Specifically, the transmit antenna spatial correlation matrix of the first sending device may be obtained in the following manner: performing, by using uplink and downlink channel reciprocity of transmit and receive antennas, spatial correlation statistics on a signal received by the first sending device. A formula used in a statistical process may be expressed as:

$$R_{AP1} = E[r_{A1} r_{A1}{}^H] \qquad \text{Formula 1.9, where}$$

$R_{A1}$ indicates the transmit antenna spatial correlation matrix of the first sending device, E indicates expectation, and $r_{A1} \in C^{N_{Antenna,AP1} \times 1}$ indicates a signal received by the first sending device, where $C^{N_{Antenna,A1} \times 1}$ indicates that the signal received by the first sending device may be indicated by a complex number of $N_{Antenna,A1} \times 1$. Further, $E[r_{A1} r_{A1}{}^H] \in C^{N_{Antenna,A1} \times N_{Antenna,A1}}$.

1204. The first sending device determines M transmit vectors, where the M transmit vectors meet a first preset condition and a second preset condition, the first preset condition is: a first channel statistical measurement value that is determined according to the M transmit vectors and the transmit antenna spatial correlation matrix is less than a first preset value, and the second preset condition is: a first interference measurement value that is determined according to the M transmit vectors and each receive effective channel vector is less than a second preset value, where M is a positive integer greater than or equal to 1.

It should be noted that, the first preset condition and the second preset condition in step 1204 are respectively corresponding to the first preset condition and the second preset condition in the embodiment shown in FIG. 10. Correspondingly, the first channel statistical measurement value, the first interference measurement value, the first preset value, and the second preset value in step 1204 are also respectively corresponding to the channel statistical measurement value, the interference measurement value, the first preset value, and the second preset value shown in FIG. 10

Specifically, the first channel measurement value is determined in the following manner:

$$CHM = \text{trace}(V_{A1}{}^H R_{A1} V_{A1}) \qquad \text{Formula 1.10, where}$$

$V_{A1}$ indicates a transmit vector matrix consisting of the M transmit vectors, $R_{A1}$ indicates the transmit antenna spatial correlation matrix, and trace indicates a trace of solving the matrix.

The first interference measurement value that is determined according to the M transmit vectors and any one of the N receive effective channel vectors may be determined by using the following formula:

$$IM = |w_{A2}{}^H H_{A2,A1} V_{A1}|^2 \times P_{A1} \qquad \text{Formula 1.11, where}$$

IM indicates the first interference measurement value, $w_{A2}{}^H H_{A2,A1}$ indicates any receive effective channel vector of the N receive effective channel vectors, $V_{A1}$ indicates the transmit vector matrix consisting of the M transmit vector, and $P_{A1}$ indicates transmit power of the first sending device.

Optionally, in an embodiment, a criterion for selecting the transmit vector includes but is not limited to any one of maximum ratio transmission (Maximum Ratio Transmission, MRT for short), zero forcing (English: Zero-Forcing, ZF for short), and a minimum mean square error (English: Minimum Minimum Squared Error, MMSE for short).

Optionally, in another embodiment, the first sending device may further determine the M transmit vectors according to the NAV duration for which each second receiving device occupies the radio resource.

Specifically, the first sending device may determine the NAV duration for which the first sending device occupies the radio resource; determine, according to the NAV duration for which the first sending device occupies the radio resource and the NAV duration for which each second receiving device occupies the radio resource, an effective interference time corresponding to each second receiving device; and determine the M transmit vectors according to the effective interference time corresponding to each second receiving device and the receive effective channel vector from each second receiving device to the first sending device.

For example, a time for which the first sending device uses the radio resource to send data is an NAV5, and the first sending device senses and records that two times for which two second receiving devices communicating with the second sending device occupy the radio resource are respectively an NAV2 and an NAV4. In this example, the first sending device is an AP1, the second sending device is an AP2, a second receiving device corresponding to the NAV2 is a STA2, and a receiving device corresponding to the NAV4 is a STA3. A receive effective channel vector from the STA2 to the first sending device is $w_{STA2}H_{STA2,AP1}$, and a receive effective channel vector from the STA3 to the first sending device is $w_{STA3}H_{STA3,AP1}$. In this case, an effective interference time NAV2' of the first sending device corresponding to the STA2 is:

NAV2'=min(NAV2,NAV5); and an effective interference time NAV4' of the first sending device corresponding to the STA3 is:

NAV4'=min(NAV4,NAV5)

The first sending device may determine a transmit vector according to the effective interference time. For example, if the first sending device needs to use a transmit vector to send data to the first receiving device, the transmit vector $v_{AP1}$ may be obtained by using the following formula:

$$v_{AP1}=f(\langle NAV5, w_{STA1}H_{STA1,AP1}\rangle, \langle NAV2', w_{STA2}H_{STA2,AP1}\rangle, \langle NAV4', w_{STA3}H_{STA3,AP1}\rangle)$$ Formula 1.12, where $v_{AP1}$ indicates the transmit vector used by the first sending device, $w_{STA1}H_{STA1,AP1}$ indicates the receive effective channel vector from the first receiving device to the first sending device, and f ( ) indicates an optimized transmit vector solving function. A specific form of the optimized transmit vector solving function varies with the criterion for selecting the transmit vector. For example, with an MMSE criterion, formula 1.7 may change into the following form:

$$V_{AP2}= w_{STA2}H_{STA2,AP2}(NAV2'^{*}w_{STA1}H_{STA1,AP2}(w_{STA1}H_{STA1,AP1})^{H}+NAV4'^{*}w_{STA3}H_{STA3,AP2}(w_{STA3}H_{STA3,AP2})^{H}+NAV5^{*}I_{N_t}^{*}\sigma_n)^{-1}$$ Formula 1.13, where $I_{Nt}$ indicates an $N_{ap} \times N_{ap}$ identity matrix, $\sigma_n$ indicates an equivalent transmitter noise coefficient, and * indicates multiplication.

1205. The first sending device may separately communicate with K first receiving devices within a first specified time by using K of the M transmit vectors and the radio resource, where K is a positive integer less than or equal to M, and the first specified time is an end time of the longest one of N NAV durations.

It may be understood that, the first specified time is the same as the specified time in the embodiment shown in FIG. 10.

A corresponding first receiving device may further determine a receive vector, so that interference caused to the first receiving device when the second sending device transmits information is within an allowed range.

1206. The first receiving device determines that the second sending device communicates with the N second receiving devices by using the radio resource, where N is a positive integer greater than or equal to 1.

A process in which the first receiving device determines that the second sending device communicates with the N second receiving devices by using the radio resource is similar to a process in which the first sending device determines that the second sending device communicates with the N second receiving devices by using the radio resource, and details are not repeatedly described herein.

1207. The first receiving device may obtain a transmit effective channel vector from the second sending device to the first receiving device and an NAV duration for which the second sending device occupies the radio resource.

The transmit effective channel vector is a product of a transmit vector v of the second sending device and a channel matrix H from the second sending device to the first receiving device.

Optionally, in an embodiment, the first receiving device may read the transmit effective channel vector in an NAV table. The transmit effective channel vector in the NAV table may be obtained in the following manner: obtaining sent information, and determining the transmit effective channel vector according to the sent information. Specifically, the sent information may be control information (for example, RTS), or may be data information. After the sent information is sensed, an NAV duration in the information may be determined, where the NAV duration is used to indicate duration of occupying the radio resource to send the information. The first receiving device senses the sent information according to the NAV duration, and determines the transmit effective channel vector according to the sent information. For example, the first receiving device may determine the transmit effective channel vector from the second sending device to the first receiving device in a measurement manner. The first receiving device may store the transmit effective channel vector into the NAV table. The first receiving device may further store the NAV duration into the NAV table. Further, the first receiving device may further delete, from the NAV table, an entry whose NAV expires. In addition, the NAV table may further include an interference source indication, and the interference source indication is used to indicate whether a corresponding device is an interference source. The interference source indication of the second sending device is yes. In this case, the first receiving device may directly select a transmit effective channel vector and an NAV duration that are corresponding to an entry whose interference source indication is yes.

Optionally, in another embodiment, the first receiving device may further determine the transmit effective channel vector from the second sending device to the first receiving device. For example, the first receiving device may determine the receive effective channel vector from the second sending device to the first receiving device in a measurement manner. Specifically, in a case in which the first receiving device senses that the second sending device sends the RTS information to the N second receiving devices, the first receiving device may determine the transmit effective channel vector from the second sending device to the first receiving device according to the RTS information. After determining the effective channel vector, the first receiving device may store the transmit effective channel vector into the NAV table. For another example, in a case in which the first receiving device senses that the second sending device sends the data information to the N second receiving devices, the first receiving device may determine the transmit effective channel vector from the second sending device to the first receiving device according to the data information. In addition, the first receiving device may determine the NAV duration for which the second sending device occupies the radio resource. Further, after determining the transmit effective channel vector, the first receiving device may store the receive effective channel vector and the NAV duration into the NAV table. Further, the first receiving device may further delete, from the NAV table, an entry of a second receiving device whose NAV expires. In addition, the NAV table may further include an interference source indication, and the interference source indication is used to indicate whether a corresponding device is an interference source.

1208. The first receiving device obtains a receive antenna spatial correlation matrix of the first receiving device.

Specifically, the receive antenna spatial correlation matrix of the first receiving device may be obtained by using the following formula:

$$R_{A4}=E[r_{A4}r_{A4}^{H}] \qquad \text{Formula 1.14, where}$$

$R_{A4}$ indicates the transmit antenna spatial correlation matrix of the first receiving device, E indicates expectation, and $r_{A4} \in C^{N_{Antenna,AP1} \times 1}$ indicates a signal received by the first receiving device, where $C^{N_{Antenna,AP} \times 1}$ indicates that the signal received by the first sending device may be indicated by a complex number of $N_{Antenna,A1} \times 1$. Further, $E[r_{A1}r_{A1}^{H}] \in C^{N_{Antenna,A1} \times N_{Antenna,A1}}$.

1209. The first receiving device determines a receive vector, where the receive vector meets a third preset condition and a fourth preset condition, the third preset condition is: a second channel statistical measurement value that is determined according to the receive vector and the receive antenna spatial correlation matrix is less than a third preset value, and the fourth preset condition is: a second interference measurement value that is determined according to the receive vector and the transmit effective channel vector is less than a fourth preset value.

It should be noted that, the third preset condition and the fourth preset condition in step 1209 are respectively corresponding to the first preset condition and the second preset condition in the embodiment shown in FIG. 10. Correspondingly, the second channel statistical measurement value, the second interference measurement value, the third preset value, and the fourth preset value in step 1209 are respectively corresponding to the channel statistical measurement value, the interference measurement value, the first preset value, and the second preset value shown in FIG. 10

Specifically, the second channel statistical measurement value is determined in the following manner:

$$CHM=w_{A4}^{H}R_{A4}w_{A4} \qquad \text{Formula 1.15, where}$$

$w_{A4}$ indicates the receive vector, and $R_{A4}$ indicates the receive antenna spatial correlation matrix.

The second interference measurement value is determined in the following manner:

$$IM=|w_{A4}^{H}H_{A4,A3}v_{A3}|^{2} \times P_{A3} \qquad \text{Formula 1.16, where}$$

$H_{A4,A3}v_{A3}$ indicates the transmit effective channel vector, $w_{A1}$ indicates the receive vector, and $P_{A3}$ indicates transmit power of the second sending device.

Optionally, in an embodiment, the criterion for selecting the receive vector includes but is not limited to any one of MRT, ZF, and MMSE.

1210. The first receiving device receives, by using the receive vector and the radio resource within a second specified time, information sent by the first sending device, where the second specified time is an end time of the NAV duration for which the second sending device occupies the radio resource.

It may be understood that, the second specified time is the same as the specified time in the embodiment shown in FIG. 11.

It should be noted that, in the embodiment shown in FIG. 12, each second receiving device is used as a receiving party to receive information sent by the second sending device. It may be understood that, each second receiving device may also be used as a sending party to send information to the second sending device. In this case, the first sending device may determine the transmit effective channel vector from each second receiving device to the first sending device. The first receiving device may determine the receive effective channel vector from the second sending device to the first receiving device. A specific process is similar to the foregoing process, and details are not repeatedly described herein.

The embodiment shown in FIG. 12 is executed in a case in which the first sending device sends information to the first receiving device. It may be understood that, the first sending device may change into a receiving device to receive information sent by the first receiving device. Therefore, the embodiment shown in FIG. 12 may further be executed in a case in which the first receiving device sends information to the first sending device. In this case, step 1201 to step 1205 in the embodiment shown in FIG. 12 are performed by the first receiving device, and step 1206 to step 1210 are performed by the first sending device.

Further, in the case in which the first sending device sends information to the first receiving device, the first sending device may further determine the receive vector according to the information sent by the second sending device at the same time when determining the transmit vector, because the first sending device may change into the receiving party to receive information sent by the first receiving device. Likewise, in the case in which the first receiving device receives information sent by the first sending device, the first receiving device may further determine the transmit vector according to the information sent by the second receiving device at the same time when determining the receive vector, because the first receiving device may change into the sending party to send information to the first sending device. A process in which the first sending device determines the receive vector is similar to a process in which the first receiving device determines the receive vector, and details are not repeatedly described herein. A process in which the first receiving device determines the transmit vector is similar to a process in which the first sending device determines the transmit vector, and details are not repeatedly described herein.

It may be understood that, in a case in which the first sending device is an AP, the first receiving device may be a STA. In a case in which the first receiving device is an AP, the first sending device may be a STA.

According to the method shown in FIG. 12, in a process in which a second sending device and N second receiving devices perform data transmission by using a radio resource, a first sending device and M first receiving devices can also perform data transmission by using the same radio resource. In addition, a process of data transmission between the first sending device and the M first receiving devices by using the same radio resource does not cause interference to data transmission between the second sending device and the N second receiving devices, nor receives interference from the second sending device and the N second receiving devices. Therefore, radio resource usage efficiency is effectively improved.

Figure 13:
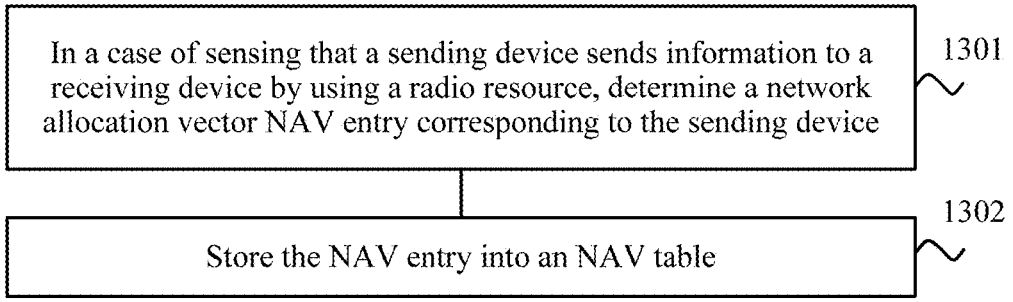
FIG. 13 is a schematic flowchart of another access method according to an embodiment.

FIG. 13 is a schematic flowchart of another access method determined by an embodiment. The method shown in FIG. 13 may be executed by a first device.

1301. In a case of sensing that a sending device sends information to a receiving device by using a radio resource, determine a network allocation vector NAV entry corresponding to the sending device, where the NAV entry includes the following content: an identifier of the sending device, an interference source indication, an NAV duration for which the sending device occupies the radio resource, and an effective channel vector from the sending device to the first device.

1302. Store the NAV entry into an NAV table, so that the first device accesses another device by using the NAV entry.

According to the method shown in FIG. 13, an NAV table may be determined. When the first device needs to access another device, the first device may directly use the entry in the NAV table to determine a parameter that needs to be used. For example, the first device may use an effective channel vector in the entry to determine a parameter that needs to be used by the first device, for example, a transmit vector and/or a receive vector.

Optionally, in an embodiment, in a case of sensing that the information sent by the sending device is data information or request to send RTS information, the first device determines a transmit effective channel vector from the sending device to the first device according to the sensed information. Further, the first device may further determine that the sending device is an interference source.

Optionally, in another embodiment, in a case of sensing that the information sent by the sending device is clear to send CTS information, the first device determines a receive effective channel vector from the sending device to the first device according to the sensed information. Further, in this case, the first device may further determine that the sending device is a non-interference source.

Meanings of the transmit effective channel vector and the receive effective channel vector are the same as meanings of the transmit effective channel vector and the receive effective channel vector in the embodiment shown in FIG. 7, and details are not repeatedly described herein.

Further, the method further includes: deleting the entry from the NAV table in a case of determining that a current time exceeds a sum of a time for creating the entry and the NAV duration for which the sending device occupies the radio resource.

It should be noted that, the device provided in this embodiment is not merely limited to a MIMO device. If a device includes only a single antenna, a related channel of the device degrades from a matrix to a vector, and a transmit or receive vector of the device degrades to 1.

A person of ordinary skill in the art may be aware that the foregoing embodiments may be logically combined with some other technologies, for example, may be used with an orthogonal frequency division multiple access (English: Orthogonal Frequency Division Multiple Access, OFDMA for short) technology. Specifically, interworking signaling and data are sent and received on a sub-channel allocated to a user, where a process of clear channel assessment (for example, steps in FIG. 1 or steps in FIG. 2, step 1001 to step 1004 in FIG. 10, and step 1201 to step 1208 in FIG. 12) and making a transmission decision based on the clear channel assessment (for example, steps in FIG. 3, step 1005 in FIG. 10, and step 1209 to step 1210 in FIG. 12) is performed by using the foregoing embodiments. The interworking signaling may be implemented by sending and receiving RTS and CTS or signaling equivalent to RTS and CTS on a corresponding sub-channel. When used with the OFDMA technology, efficiency of an ODFMA system in a multi-cell scenario is improved.

For another example, the foregoing embodiments may be used with a multi-user multiple-input multiple-output (English: Multi-User Multiple-Input Multiple-Output, MU-MIMO for short) technology. For multiple MU-MIMO data streams, NAV information of the multiple streams that can be detected may be recorded in a MIMO NAV table, and a transmission decision is made based on the NAV information. Therefore, efficiency of an MU-MIMO system in a multi-cell scenario is improved.

Likewise, the foregoing embodiments may be used in a system that jointly uses the OFDMA technology and the MU-MIMO technology.

Figure 14:
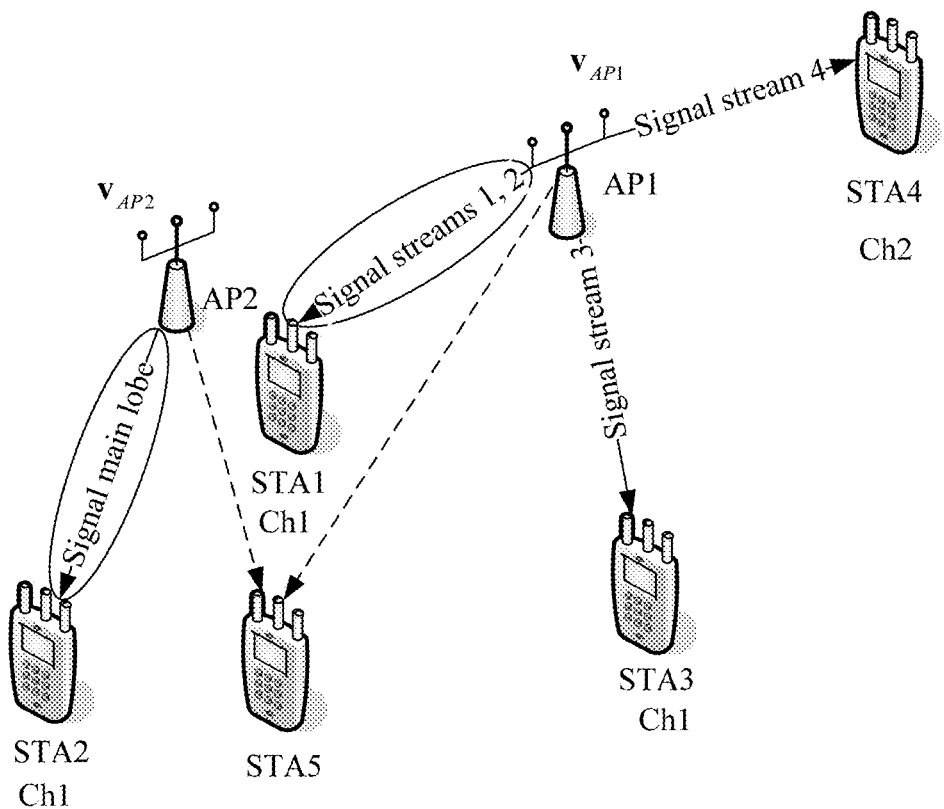
FIG. 14 is another working principle schematic diagram according to an embodiment.

FIG. 14 is a working principle schematic diagram of an embodiment applied to a system that jointly uses an OFDMA technology and an MU-MIMO technology.

Referring to the multi-channel system shown in FIG. 14, an AP supports multi-stream transmission, where on a channel Ch1, an AP1 sends a spatial data stream (English: stream) 1 and a data stream 2 to a STA1, and sends a spatial data stream 3 to a STA3. On a channel Ch2, the AP1 sends a spatial data stream 4 to a STA4. On the channel Ch1, an AP2 sends a spatial data stream 1 to a STA2. In the foregoing scenario, a STA5 may store a MIMO NAV table shown in FIG. 6. Correspondingly, a STA5 may make a transmission decision by using an NAV recording table shown in FIG. 6.

TABLE 6

| Transmit end | Receive end | Channel | Data stream | NAV duration | Effective channel vector |
|---|---|---|---|---|---|
| AP1 | STA1 | Ch1 | Stream1 | NAV1 | $H_{STA5,\,AP1}V_{AP1,\,1}$ |
| AP1 | STA1 | Ch1 | Stream2 | NAV2 | $H_{STA5,\,AP1}V_{AP1,\,2}$ |
| AP2 | STA2 | Ch1 | Stream1 | NAV3 | $H_{STA5,\,AP2}V_{AP2}$ |
| AP1 | STA3 | Ch1 | Stream3 | NAV4 | $H_{STA5,\,AP1}V_{AP1,\,3}$ |
| AP1 | STA4 | Ch2 | Stream4 | NAV5 | $H_{STA5,\,AP1}V_{AP1,\,4}$ |

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments, but are not intended to limit the protection scope. Any variation or replacement readily figured out by a person skilled in the art within the technical scope disclosed in the present invention shall fall within the protection scope. Therefore, the protection scope shall be subject to the protection scope of the claims.

What is claimed is:

1. A device, comprising:
a memory; and
a processor coupled to the memory and configured to:
determine that N second receiving devices communicate with a second sending device by using a radio resource, wherein N is a positive integer greater than or equal to 1;
obtain a receive effective channel vector from each second receiving device to the device, and a network allocation vector NAV duration for which each second receiving device occupies the radio resource;
obtain a transmit antenna spatial correlation matrix of the device;
determine M transmit vectors, wherein the M transmit vectors meet a first preset condition and a second preset condition, the first preset condition is: a channel statistical measurement value that is determined according to the M transmit vectors and the transmit antenna spatial correlation matrix is less than a first preset value, and the second preset condition is: all N interference measurement values that are determined according to the M transmit vectors and N receive effective channel vectors are less than a second preset value, wherein M is a positive integer greater than or equal to 1; and
separately communicate with K first receiving devices within a specified time by using K of the M transmit vectors and the radio resource, wherein K is a positive integer less than or equal to M, and the specified time is an end time of the longest one of N NAV durations.

2. The device according to claim 1, wherein the processor is further configured to:
read the receive effective channel vector from each second receiving device to the device in an NAV table, wherein the receive effective channel vector from each second receiving device to the device in the NAV table is obtained by:
obtaining information sent by each second receiving device, and determining, according to the information sent by each second receiving device, the receive effective channel vector from each second receiving device to the device.

3. The device according to claim 1, wherein the processor is further configured to determine the channel statistical measurement value by using the following formula:

$$CHM = V_{A1}{}^H R_{A1} V_{A1}, \text{wherein}$$

CHM indicates the channel statistical measurement value, $V_{A1}$ indicates a transmit matrix consisting of the M transmit vectors, $V_{A1}{}^H$ indicates a conjugate of the transmit matrix $V_{A1}$, and $R_{A1}$ indicates the transmit antenna spatial correlation matrix.

4. The device according to claim 1, wherein the processor is further configured to determine the interference measurement value in the following manner:

$$IM = |w_{A2}{}^H H_{A2,A1} V_{A1}|^2 \times P_{A1}, \text{wherein}$$

$w_{A2}{}^H H_{A2,A1}$ indicates a receive effective channel vector from any one of the N second receiving devices to the device, $w_{A2}{}^H$ indicates a conjugate of a receive vector of the any second receiving device, $H_{A2,A1}$ indicates a channel matrix from the any second receiving device to the device, $V_{A1}$ indicates the transmit matrix consisting of the M transmit vectors, $P_{A1}$ indicates transmit power of the device, and IM indicates an interference measurement value corresponding to the any second receiving device.

5. The device according to claim 1, wherein the processor is further configured to determine the M transmit vectors according to the NAV duration for which each second receiving device occupies the radio resource.

6. A device, comprising:
a memory; and
a processor coupled to the memory and configured to:
determine that a second sending device communicates with N second receiving devices by using a radio resource;
obtain a transmit effective channel vector from the second sending device to the device, and a network allocation vector NAV duration for which the second sending device occupies the radio resource; wherein
obtain a receive antenna spatial correlation matrix of the device;
determine a receive vector, wherein the receive vector meets a first preset condition and a second preset condition, the first preset condition is: a channel statistical measurement value that is determined according to the receive vector and the receive antenna spatial correlation matrix is less than a first preset value, and the second preset condition is: an interference measurement value that is determined according to the receive vector and the transmit effective channel vector is less than a second preset value; and
communicate with a first sending device within a specified time by using the receive vector and the radio resource, wherein the specified time is an end time of the NAV duration.

7. The device according to claim 6, wherein the processor is further configured to read the transmit effective channel vector in an NAV table, and the transmit effective channel vector in the NAV table is obtained b:
obtaining information sent by the second sending device, and determining the transmit effective channel vector according to the information sent by the second sending device.

8. An access method executed by a first sending device, the method comprising:
determining that N second receiving devices communicate with a second sending device by using a radio resource, wherein N is a positive integer greater than or equal to 1;
obtaining a receive effective channel vector from each second receiving device to the first sending device, and a network allocation vector NAV duration for which each second receiving device occupies the radio resource;
obtaining a transmit antenna spatial correlation matrix of the first sending device;
determining M transmit vectors, wherein the M transmit vectors meet a first preset condition and a second preset condition, the first preset condition is: a channel statistical measurement value that is determined according to the M transmit vectors and the transmit antenna spatial correlation matrix is less than a first preset value, and the second preset condition is: all N interference measurement values that are determined according to the M transmit vectors and N receive effective channel vectors are less than a second preset value, wherein M is a positive integer greater than or equal to 1; and
separately communicating with K first receiving devices within a specified time by using K of the M transmit vectors, wherein K is a positive integer less than or equal to M, and the specified time is one of N NAV durations.

9. The method according to claim 8, wherein the obtaining a receive effective channel vector from each second receiving device to the first sending device comprises:
reading the receive effective channel vector from each second receiving device to the first sending device in an NAV table, wherein the receive effective channel vector from each second receiving device to the first sending device in the NAV table is obtained in the following manner:
obtaining information sent by each second receiving device, and determining, according to the information sent by each second receiving device, the receive effective channel vector from each second receiving device to the first sending device.

10. The method according to claim 8, wherein the channel statistical measurement value is determined by using the following formula:

$CHM = V_{A1}^H R_{A1} V_{A1}$, wherein

CHM indicates the channel statistical measurement value, $V_{A1}$ indicates a transmit matrix consisting of the M transmit vectors, $V_{A1}^H$ indicates a conjugate of the transmit matrix $V_{A1}$, and $R_{A1}$ indicates the transmit antenna spatial correlation matrix.

11. The method according to claim 8, wherein the interference measurement value is determined in the following manner:

$IM = |w_{A2}^H H_{A2,A1} V_{A1}|^2 \times P_{A1}$, wherein $w_{A2}^H H_{A2,A1}$ indicates a receive effective channel vector from any one of the N second receiving devices to the first sending device, $w_{A2}^H$ indicates a conjugate of a receive vector of the any second receiving device, $H_{A2,A1}$ indicates a channel matrix from the any second receiving device to the first sending device, $V_{A1}$ indicates the transmit matrix consisting of the M transmit vectors, $P_{A1}$ indicates transmit power of the device, and IM indicates an interference measurement value corresponding to the any second receiving device.

12. An access method executed by a first receiving device, the method comprising:
determining that a second sending device communicates with N second receiving devices by using a radio resource;
obtaining a transmit effective channel vector from the second sending device to the first receiving device, and a network allocation vector NAV duration for which the second sending device occupies the radio resource;
obtaining a receive antenna spatial correlation matrix of the first receiving device;
determining a receive vector, wherein the receive vector meets a first preset condition and a second preset condition, the first preset condition is: a channel statistical measurement value that is determined according to the receive vector and the receive antenna spatial correlation matrix is less than a first preset value, and the second preset condition is: an interference measurement value that is determined according to the receive vector and the transmit effective channel vector is less than a second preset value; and
communicating with a first sending device within a specified time by using the receive vector and the radio resource, wherein the specified time is an end time of the NAV duration.

13. The method according to claim 12, wherein the obtaining a transmit effective channel vector from the second sending device to the first receiving device comprises:
reading the transmit effective channel vector in an NAV table, wherein the transmit effective channel vector in the NAV table is obtained in the following manner:

obtaining information sent by the second sending device, and determining the transmit effective channel vector according to the information sent by the second sending device.

14. The method according to claim 12, wherein the second channel statistical measurement value is determined in the following manner:

$$CHM = w_{A1}^H R_{A1} w_{A1}, \text{ wherein}$$

CHM indicates the channel statistical measurement value, $w_{A1}$ indicates the receive vector, $w_{A1}^H$ indicates a conjugate of the receive vector $w_{A1}$, and $R_{A1}$ indicates the receive antenna spatial correlation matrix.

* * * * *

UNITED STATES PATENT AND TRADEMARK OFFICE
CERTIFICATE OF CORRECTION

PATENT NO. : 10,554,269 B2
APPLICATION NO. : 15/440687
DATED : February 4, 2020
INVENTOR(S) : Yanchun Li Page 1 of 1

It is certified that error appears in the above-identified patent and that said Letters Patent is hereby corrected as shown below:

In the Claims

In Column 27, Line 30, Claim 7, delete "b:" and insert --by:--.

Signed and Sealed this
Twenty-eighth Day of July, 2020

Andrei Iancu
*Director of the United States Patent and Trademark Office*